(12) United States Patent
Homann

(10) Patent No.: US 6,993,819 B2
(45) Date of Patent: Feb. 7, 2006

(54) METHOD OF PRODUCING A JOINT BETWEEN A CORRUGATED TUBE AND A COUPLING

(75) Inventor: Jörn Homann, Hannover (DE)

(73) Assignee: Brugg Rohr AG, Holding, Brugg (CH)

( * ) Notice: Subject to any disclaimer, the term of this patent is extended or adjusted under 35 U.S.C. 154(b) by 158 days.

(21) Appl. No.: 10/771,733

(22) Filed: Feb. 4, 2004

(65) Prior Publication Data

US 2004/0177486 A1    Sep. 16, 2004

(30) Foreign Application Priority Data

Mar. 13, 2003 (DE) ................................ 103 10 938

(51) Int. Cl.
*B23P 25/00* (2006.01)
*B21D 39/00* (2006.01)

(52) U.S. Cl. .......................................... 29/458; 29/508

(58) Field of Classification Search .................. 29/458, 29/460, 508, 516, 525, 530; 285/226, 222, 285/47
See application file for complete search history.

(56) References Cited

U.S. PATENT DOCUMENTS 3,844,587 A * 10/1974 Fuhrmann et al. ............ 285/47
4,063,757 A * 12/1977 Fuhrmann ................. 285/222.1
5,738,385 A * 4/1998 Homann et al. ............. 285/226

FOREIGN PATENT DOCUMENTS

| CH | 589249 | 6/1977 |
|----|--------|--------|
| DE | 3341297 A1 | 6/1985 |
| DE | 3302450 C2 | 5/1991 |
| DE | 4027818 A1 | 3/1992 |
| EP | 0775865 A1 | 11/1996 |
| EP | 0 775 865 | 5/1997 |
| FR | 2 641 842 | 7/1990 |

* cited by examiner

*Primary Examiner*—John C. Hong
(74) *Attorney, Agent, or Firm*—Ware, Fressola, Van der Sluys & Adolphson LLP

(57) ABSTRACT

A method of producing a joint between the end of a helically corrugated metal tube and a coupling, whereby a support ring (2) is screwed into the end of the helically corrugated metal tube until a smooth walled area (2b) remains both inside the metal tube and also protrudes from its end. A thrust collar (1) is screwed onto the end of the metal tube so that a smooth walled area (1c) of the thrust collar (1), which is equipped with a flange (1b), protrudes from the end of the metal tube. A graphite sealant ring (3) is inserted into the end of the metal tube where it is axially and radially deformed and compressed by the action of clamping bolts (6), which are inserted into holes in the flange (1b) of the thrust collar (1) and a flange (4b) of the coupling (4) and clamp the flanges (1b, 4b) together.

4 Claims, 1 Drawing Sheet

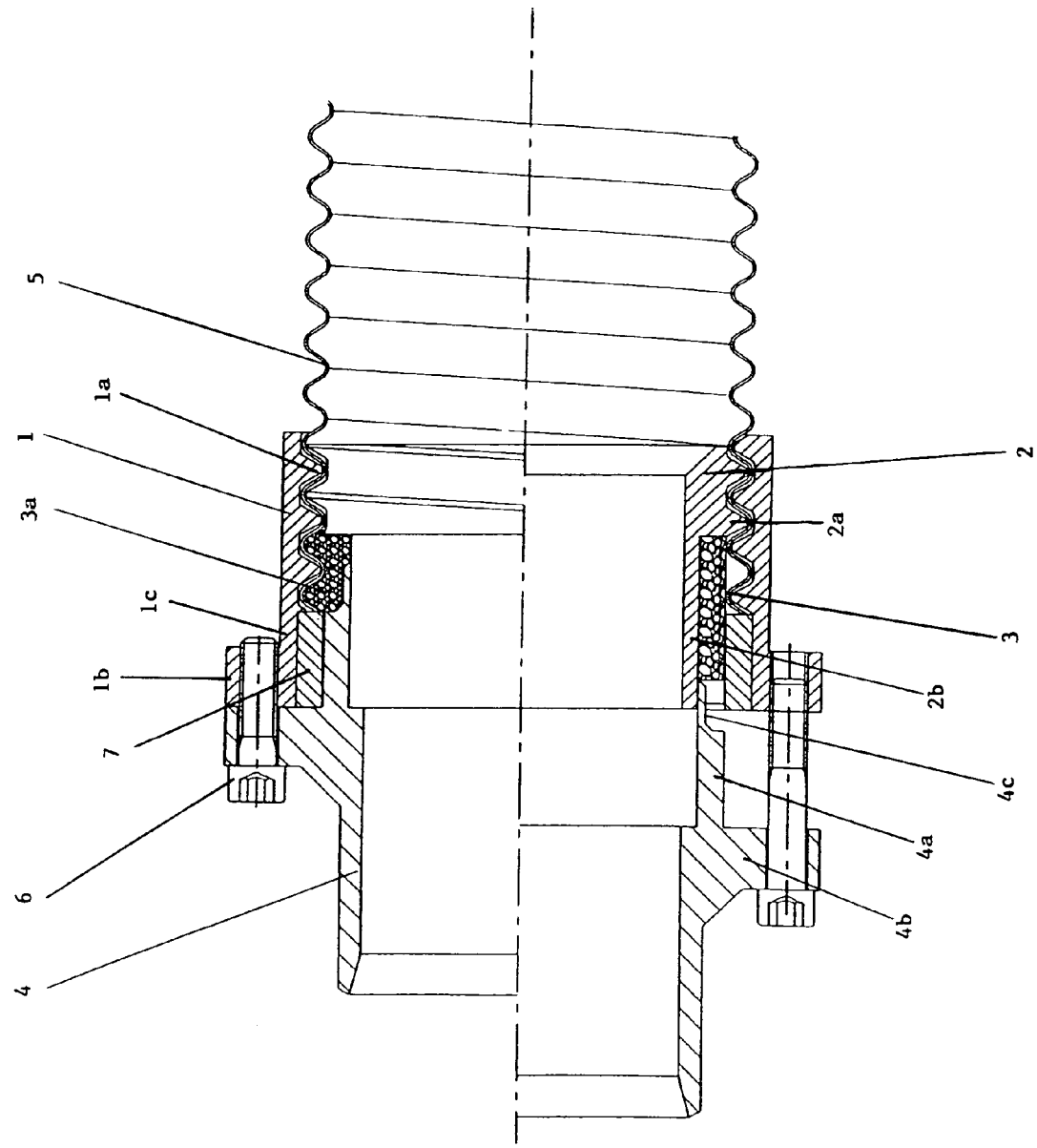

METHOD OF PRODUCING A JOINT BETWEEN A CORRUGATED TUBE AND A COUPLING

BACKGROUND OF THE INVENTION

1. Technical Field

The invention concerns a method of producing a joint between the end of a helically corrugated metal tube and a coupling.

2. Description of the Background Art

There are many ways of connecting metal tubes to each other or producing a joint between a metal tube and a coupling. Thus it is commonplace to solder or to weld or to screw the cited components to each other.

Joining thin-walled tubes to each other or to a coupling is problematic since it is difficult to screw or weld them together because of the thin wall thickness, and soldering can only be used on a few metals.

Even more complicated is joining a thin-walled helically corrugated metal tube to a coupling.

It is known from CH-PS 589 249 to roll the end of a corrugated metal tube against the inner surface of a flange, which flattens the corrugation. The high pressure created during the rolling process produces a tight pressure connection between the previously corrugated metal tube and the metal flange. This type of joint requires expensive equipment in the assembly area and presupposes thick-walled preformed parts.

Another kind of joint for corrugated metal tubes is described in DE-PS 33 02 450. A support bushing is screwed onto the end of a corrugated tube and a pipe socket is screwed into the end of the corrugated tube. The sealing is provided in that the clear width of the support bushing increases toward the end and/or the outside diameter of the pipe socket decreases toward the end. When the pipe socket is screwed into the end of the corrugated tube, which has been adapted for the inside contour of the outer bushing by means of a molding tool, the corrugated tube becomes sealed between the pipe socket and the support bushing.

A connecting valve for helically corrugated metal tubes is known from DE-OS 40 27 818 and comprises an outer bushing that is screwed onto the end of the corrugated tube, and a smooth tube neck which protrudes from the end of the corrugated tube. The smooth tube neck has an internal thread into which a tube connection piece is screwed. A stepped end of the tube connection piece penetrates into the corrugated tube. The corrugation at the end of the corrugated tube is crushed when the tube connection piece is screwed in. The sealing is provided by inserting a graphite sealing strip into the final corrugations, which becomes deformed by the crushed corrugations and is pressed against the inner wall of the outer bushing and the stepped end of the pipe socket penetrating into the end of the corrugated tube.

A sealant packing for corrugated tubes is known from DE-A-3 341 297; it comprises two bushings that fit into each other and can be moved with respect to each other, between which an annular space for receiving a sealing material is formed around the corrugated tube. A corrugated tube sleeve which fits the inside of the sealing area is provided. Graphite is suggested as the sealing material.

An arrangement for joining the end of a corrugated tube to a coupling is known from EP 0 775 865 B2, where a support ring is screwed into the end of the corrugated tube and its end protrudes from said corrugated tube. A thrust collar is screwed onto the end of the corrugated tube until the end of said corrugated tube protrudes. The coupling and the thrust collar form a sealed chamber in which a graphite sealant ring is placed so that it is compressed by the axial pressure effect of the thrust collar and the coupling.

SUMMARY OF THE INVENTION

The object of the present invention is to create a joint for helically corrugated metal tubes with a coupling piece, which is composed of simple components and can be installed without special tools. In particular the force required for the installation is being reduced. This object is achieved with the following steps:

(a) screwing a support ring with a coarse thread that fits the corrugation of the metal tube and extends over a portion of an outer surface thereof into an end of the metal tube until a smooth walled area with a smaller outside diameter than a clear width of the metal tube remains both inside the metal tube and also protrudes from the end of the metal tube;

(b) screwing a thrust collar with a coarse thread that fits the corrugation of the metal tube onto the end of the metal tube so that a smooth walled area of the thrust collar, which is equipped with a flange, protrudes from the end of the metal tube;

(c) inserting a graphite sealant ring into the end of the metal tube until the sealant ring abuts against the smooth walled area of the support ring;

(d) arranging a tube piece between the coupling and the smooth walled area of the thrust collar;

(e) inserting a coupling with a neck whose cross-section corresponds to the cross section between the smooth walled area of the support ring and the tube piece, is inserted into the space between the smooth walled area of the support ring and the tube piece; and (f) axially and radially deforming and compressing the sealant ring by action of clamping bolts, which are inserted into holes in the flange of the thrust collar and a flange of the coupling and clamp the flanges together.

Desirably, the sealant ring is pressed into the corrugation of the metal tube and the volume of the sealant ring is reduced in a range of about 10% to 35%.

The advantage is that the arrangement of the sealant ring on the inside of the corrugated tube, while it still produces pressure over the same surface area, considerably reduces the required pressure forces by comparison with a sealant ring that is arranged on the outer surface of the corrugated tube.

Another advantage is that the size of the sealant ring is smaller and thereby reduces the cost of the sealant ring. The arrangement of the sealant ring on the inner wall of the corrugated tube also causes the entire joint to be significantly more compact than the known connection.

The invention is explained in greater detail by means of the schematic embodiment shown in the drawing.

BRIEF DESCRIPTION OF THE DRAWING

The FIGURE is a cross-sectional view of a joint between a corrugated tube and a coupling with the lower half of the drawing showing the condition before the compression and the upper half showing the finished condition.

DETAILED DESCRIPTION OF THE INVENTION

First the coarse thread 2*a* of a support ring 2 is screwed into the smoothly sawed-off end of the corrugated tube 5 until a portion of the smooth walled area 2*b* protrudes from the end of the corrugated tube 5. A graphite sealant ring 3, which is somewhat shorter than the length of the smooth walled area 2b, is installed on said smooth walled area 2b.

The coarse thread 1a of a thrust collar 1 is screwed onto the corrugated tube 5 until its final thread is flush with the end of the corrugated tube 5 and a smooth walled area 1c protrudes from the end of the corrugated tube.

A metal tube piece 7 is placed over the sealant ring 3.

The coupling 4 has a neck 4a which is inserted into the annular clearance between the corrugated tube 5 and the smooth walled area 2b.

The clamping bolts 6 are inserted into not further described holes in the flange 4b of the coupling 4 and in the flange 1b of the thrust collar 1, and clamp the flanges 4b and 1b together. To that end the holes in flange 1b are threaded.

The sealant ring 3 is deformed and compressed when the clamping bolts 6 are tightened. This axial and radial deformation causes the sealant ring 3 to be pressed against the walls of the chamber formed by the support ring 2, the corrugated tube 5, the tube piece 7 as well as the coupling 4. The material of the sealant ring 3 is graphite. Pressure on the sealant ring 3 compresses the graphite by 10–35%, i.e. the starting volume of the sealant ring 3 is reduced by the indicated amount.

The special arrangement of the open end 4c of the neck 4a, which penetrates into the corrugated tube 5, assists the radial deformation and compression.

The corrugated tube joint according to the invention can be produced in the field without special tools and without much force, which guarantees a high degree of security against leakage.

What is claimed is:

1. A method of producing a joint between an end of a helically corrugated metal tube and a coupling comprising the steps of:
   (a) screwing a support ring with a coarse thread that fits the corrugation of the metal tube and extends over a portion of an outer surface thereof into an end of the metal tube until a smooth walled area with a smaller outside diameter than a clear width of the metal tube remains both inside the metal tube and also protrudes from the end of the metal tube;
   (b) screwing a thrust collar with a coarse thread that fits the corrugation of the metal tube onto the end of the metal tube so that a smooth walled area of the thrust collar, which is equipped with a flange, protrudes from the end of the metal tube;
   (c) inserting a graphite sealant ring into the end of the metal tube until the sealant ring abuts against the smooth walled area of the support ring;
   (d) arranging a tube piece between the coupling and the smooth walled area of the thrust collar;
   (e) inserting a coupling with a neck whose cross-section corresponds to the cross section between the smooth walled area of the support ring and the tube piece, is inserted into the space between the smooth walled area of the support ring and the tube piece; and
   (f) axially and radially deforming and compressing the sealant ring by action of clamping bolts, which are inserted into holes in the flange of the thrust collar and a flange of the coupling and clamp the flanges together.

2. A method as claimed in claim 1, wherein, during the deforming and compressing step, the sealant ring is pressed into at least one corrugation of the metal tube.

3. A method as claimed in claim 2, wherein, during the deforming and compressing step, the volume of the sealant ring is reduced in a range from about 10% to 35%.

4. A method as claimed in claim 1, wherein, during the deforming and compressing step, the volume of the sealant ring is reduced in a range from about 10% to 35%.

* * * * *